(12) United States Patent
Dietrich et al.

(10) Patent No.: US 7,439,835 B2
(45) Date of Patent: Oct. 21, 2008

(54) ROTARY SELECTOR

(75) Inventors: Mike Dietrich, Bornow (DE); Thomas Kaltofen, Berlin (DE); Michael Lamprecht, Berlin (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 96 days.

(21) Appl. No.: 11/048,508

(22) Filed: Jan. 31, 2005

(65) Prior Publication Data

US 2005/0205395 A1    Sep. 22, 2005

Related U.S. Application Data

(63) Continuation of application No. PCT/EP03/007016, filed on Jul. 1, 2003.

(30) Foreign Application Priority Data

Jul. 31, 2002    (DE) ................ 102 34 925

(51) Int. Cl.
*H01H 9/00*    (2006.01)

(52) U.S. Cl. .................... 335/207; 335/205; 324/207.2; 324/207.21

(58) Field of Classification Search .............. 324/207.2, 324/207.21, 207.25, 207.5; 335/205–207
See application file for complete search history.

(56) References Cited

U.S. PATENT DOCUMENTS

| 4,054,860 | A | | 10/1977 | Henderson et al. |
| 5,148,106 | A | * | 9/1992 | Ozawa ................... 324/207.21 |
| 5,464,955 | A | * | 11/1995 | Cole .......................... 200/317 |
| 5,606,155 | A | * | 2/1997 | Garcia ....................... 200/11 R |
| 5,668,359 | A | * | 9/1997 | Alvord et al. ................ 200/6 B |
| 5,757,180 | A | * | 5/1998 | Chou et al. ............... 324/207.2 |
| 6,023,213 | A | * | 2/2000 | Van Zeeland ............... 335/205 |
| 6,100,476 | A | * | 8/2000 | Adamietz et al. .............. 200/4 |
| 6,140,898 | A | | 10/2000 | Satoh et al. |
| 6,188,332 | B1 | | 2/2001 | Scarlata |
| 6,452,119 | B1 | | 9/2002 | Gessner |
| 7,038,156 | B2 | * | 5/2006 | Kim et al. .................... 200/564 |
| 2003/0024796 | A1 | * | 2/2003 | Peterson et al. ........... 200/11 R |
| 2004/0257068 | A1 | * | 12/2004 | Wolber et al. .......... 324/207.12 |

FOREIGN PATENT DOCUMENTS

| EP | 0 156 717 A1 | 10/1985 |
| EP | 0 600 780 A1 | 6/1994 |

OTHER PUBLICATIONS

International Search Report for PCT/EP2003/007016 Dec. 19, 2003.

* cited by examiner

*Primary Examiner*—Lincoln Donovan
*Assistant Examiner*—Bernard Rojas
(74) *Attorney, Agent, or Firm*—Russell W. Warnock; James E. Howard

(57) ABSTRACT

A rotary selector as display console for contact-free on and off switching as well as for switching of the automatic control of a number of different cycles of electronically operated domestic applicances, such as washing machines, dryers, dishwashers or comparable units. The rotary selector (1) has mutually communicating catch devices and a plate arranged at a distance thereto with a rotary field sensor acording to Hall technology, whereby spring-loaded ball lockings enable defined and switchable rotation of an operating element (2) with magnetic device in ranges up to 360°, and whereby angle-dependent variables for control of a wide range of cycles are generated in a known manner in the rotary field sensor.

20 Claims, 2 Drawing Sheets

ROTARY SELECTOR

Figure 1:
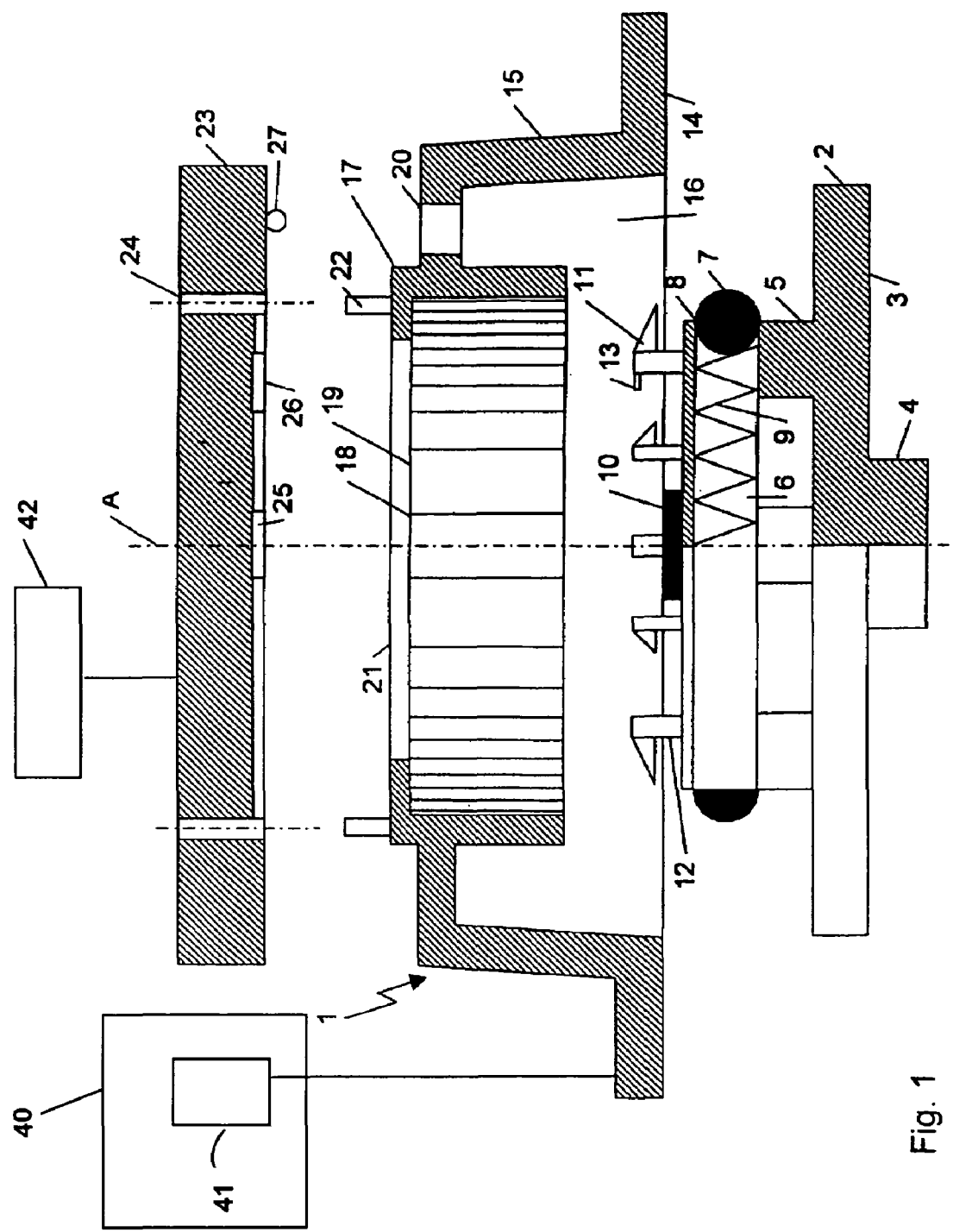

The invention relates to a rotary selector as display console for contact-free on and off switching as well as for switching of the automatic control of a number of different cycles of electrically operated domestic appliances, such as washing machines, dryers, dishwashers or comparable units.

Rotary selectors of the abovementioned type are provided on the relevant devices by corresponding means usually fixed in a position suitable for a user, for example on the front side, and act both as manual switching on and off of power and as control of work cycles for the respective device.

Automatic program control established according to predetermined criteria is activated through defined rotation of the switch shaft by means of the corresponding operating element on the rotary selector and after the power supply is switched on.

For this purpose a magnetic device attached to the switch shaft is rotated in a defined manner relative to a rotary field sensor fixed at a distance according to Hall technology, at which the control of corresponding component sets is introduced with respect to a preset number, the type and the duration of preset cycles in the above devices.

Assigned to different angled positions of the magnetic device relative to the rotary field sensor in this way is a wide range of cycles, which are preselected randomly via the rotary selector and then automatically processed by the device.

Through their friction, minimal only in the region of the swivel-mounting of the switch shaft, these rotary selectors work quasi friction-free and additionally contact-free, resulting in a long service life. In addition, these rotary selectors can be used for high acting area temperatures on account of components and building elements being used.

By rotating the magnetic device relative to the rotary field sensor it is possible for example, to induce as many as 256 different switch positions on the periphery of a revolution of the magnet of 360°, which can be employed to control any program functions in devices of the type initially mentioned.

The disadvantage however of rotary selectors of the abovementioned type is that they themselves are expensive to assemble and additionally to adjust in the respective devices. Also, the various switch positions of the switch shaft of the rotary selector cannot be reproduced precisely.

The object of the invention is to provide a rotary selector for the program control of domestic appliances, which can be switched precisely and which additionally is easy to mount in the respective devices.

This task is solved as specified in claim 1. Advantageous configurations and further developments of the invention are described in associated independent claims.

The invention advantageously enables assembly of the rotary selector to be simplified and its function to be improved by an exactly presettable position of a selected program step or also of a complete program. In addition, costs are lowered by simplifying assembly in the respective devices.

Compared to the abovementioned solutions the rotary selector according to the invention has a smaller footprint, resulting in a reduction in space requirement in the corresponding device, for example in a laundrette. In addition, variations of program positions or changes in the locking contour can be achieved easily, while the rotary selector remains constant, and customer demands can be better catered for.

The sets of components joined together axially by the plug-in system—rotatable control part, guide component and plate—of the inventive rotary selector also beneficially enable them to be exchanged problem-free, for example when repair or maintenance are required, thus reducing the repair time and uses for error analysis.

The rotary selector-according to the present invention is insensitive to heat, as are previous solutions, and can therefore be utilised problem-free up to an acting temperature range of approximately 120° C.

The measures provided according to a first and second further development of the invention are particularly suited to precisely set the respective switch position for a corresponding program as compared to the rotary field sensor. Each of the switch positions can be recognised both acoustically and by feel by the ball catch, so that the selected program step can easily be set or corrected.

The measure provided according to a third further development of the invention provides the arrangement of catch balls in the operating element, for which the guide component is used with a number of axial depressions adapted by the balls, in a for example truncated tapering in the panel of the device.

Compared to simple use the double ball catch has the advantage of more uniform locking. The number of depressions is to be made in both forms relative to the number of program steps, whereby a relatively large radius of the locking contour is assigned on a large program scale.

The assembly of the rotatable operating element can be done easily by compressing the balls and axial insertion in the guide component at a corresponding position.

The advantage according to a fourth further development as an alternative to the above variant is in particular that the locking contour is easier to produce, because its depressions are to be machined on the periphery with projected tip. In particular this variant can be employed in a small program scale.

The advantage of a fifth further development of the invention is that the rotary field sensor can be adjusted precisely relative to the magnetic device in order to thus achieve precise program assignation to the respective positioning of the operating element.

A possibility of fixing the operating element in the panel of the device is possible via a sixth further development of the invention, if parts of a thread pitch in the operating element correspond to parts of an identical thread pitch in the panel. Simple assembly of the operating element at a corresponding position similar to a screw-type cap is easy to effect by its axial insertion in the locking contour with subsequent brief rotary movement.

The measure provided according to a seventh further development serves both to rotate the operating element and as axial fixing, whereby proportional tolerance is provided between the opposing parts rotatable in an axial direction.

The following configurations of the invention are particularly suited to integrating the function of the main switch in the function of the rotary selector. Through ensuing contact of the spring element on one of the retaining pegs with corresponding rotation of the operating element with a microbutton arranged at a preset position on the plate, the switching functions of the voltage supply are enabled both "on" and "off" via a relay.

The characteristics provided according to a tenth and eleventh configuration of the invention are suited to indirectly illuminating the immediate environment of the carrier on the operating element and the panel, thus significantly improving the recognisability of the respective program positions of the rotary selector in particular in unfavourable illuminations conditions.

The characteristics of the twelfth configuration of the invention on the one hand enable the plate to be provided as a part of a printed circuit board with corresponding electrical connections to the printed circuit board, or the printed circuit board itself to be connected directly to the guide component, simplifying assembly.

Also shown are which effects of the rotary selector according to the invention acts on the remaining control components during use.

Figure 2:
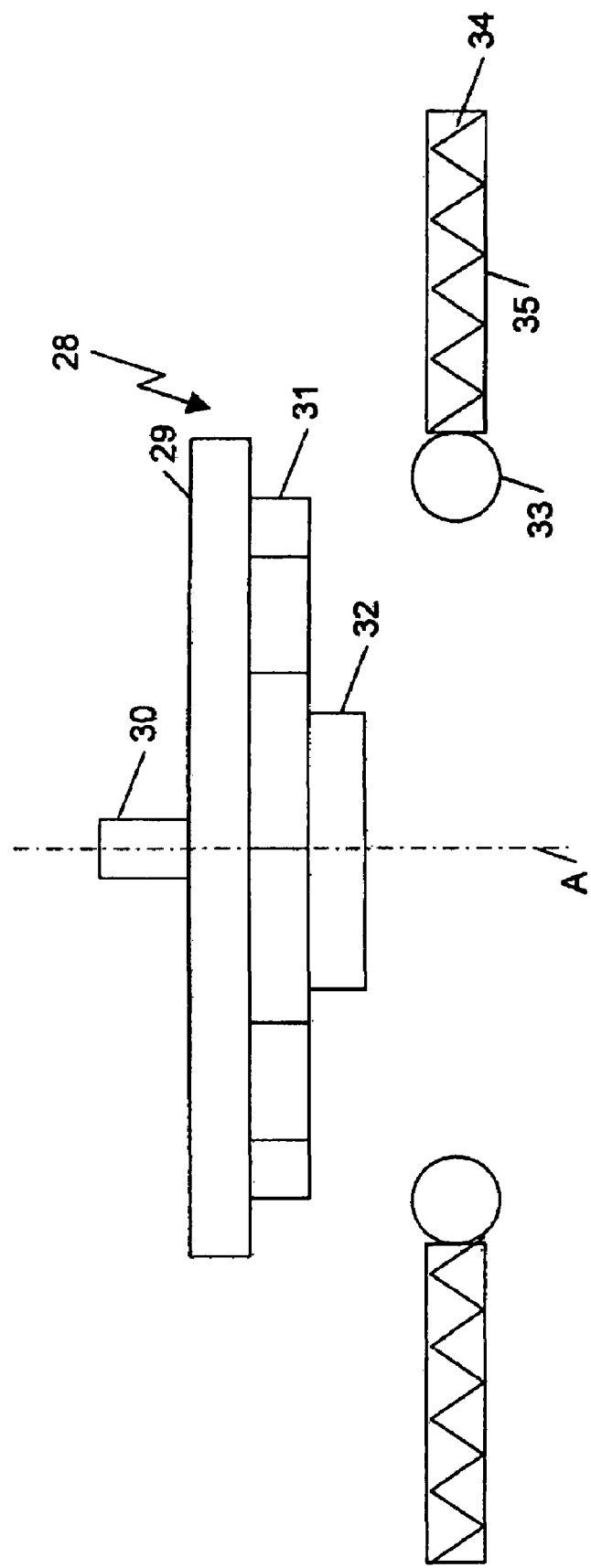

The invention will now be explained hereinbelow in greater detail by means of an embodiment and by way of the accompanying drawings, in which:

FIG. 1 is a schematic exploded illustration through an inventive rotary selector, and FIG. 2 is a simplified illustration of a locking device with external locking contour.

In FIG. 1 of the drawing a rotary selector according to the invention is characterised with position 1, illustrated schematically with its parts shown in exploded drawing. For the sake of simplicity in the described embodiment no further detail is gone into for the required electrical connections.

According to FIG. 1 the rotary selector 1 has a rotatable operating element 2, which has a for example circular carrier 3 with a rotary knob 4 arranged in the middle of its axis A.

Arranged on the carrier 3 in the design described are legs 5, on which a catch element 6 is provided centrically, here formed from a hollow-cylindrical body.

The catch element 6 has at least one ball 7, which is mounted with defined pressure in a ball guide 8 machine in the wall with a diameter matching the ball 7 in known fashion against a spring element counteracting inside the catch element 6, for example a compression spring 9.

In the design described here a double ball catch with two balls 7 is provided, which are mounted in the wall of the catch element 6 arranged exactly opposite and through spring-loaded pressure in the ball guide 8. A magnetic device 10 known per se with a preset magnetic field is fixed centrally on an adjoining surface in an axial direction of the catch element 6.

Also provided on a periphery in the edge region of the same surface is a number of hooked designed retaining pegs 11 arranged uniformly at a distance, and acting radially outward. The distance 12 provided on the underside of the outwardly directed hooked form corresponds with the thickness of the guide component 17 at the relevant place. Arranged on at least one of the retaining pegs 11 at its outer end is a spring element 13 pointing radially inwards.

Arranged in the further direction of the axis A in a panel 14 adapted to the respective device as part of its cladding in a depression 16 formed by a recess 15 is a hollow-cylindrical formed guide component 17.

Inside the guide component 17 is a locking contour 18, whereof the axially arranged, fluted depressions 19 are adapted to the geometry of the balls 7 of the catch element 6. The number of depressions 19 is identical to the number of possible switch positions of the rotary selector 1.

The depressions 19 are thus to be produced by free selection with respect to number and form, by which different program steps and additionally different quantities of programs can be made available per rotary selector and device in agreement with the associated software, for example according to customer wish.

Openings 20 are made in an annular leg between the recess 15 and the guide component 17 likewise annular and at a distance to one another, resulting in a partially open connection to the area of the recess 16. Provided on the upper, circular surface 21 of the guide component 17 according to the diagram in the present design are guide pins 22 at defined positions arranged opposite on the same part circle.

A plate 23 is shown in a further axial direction according to the diagram, which is formed for example in circular disc form and is in connection with a printed circuit board 42 for accommodating required electrical components for switching and control of the device.

The plate 23 has at least one, preferably two bores as guides 24, which correspond to the guide pins 22 in the guide component 17 as centring to their positioning.

Arranged on the underside of the plate 23 as illustrated according to the diagram in a centric recess centrally to the axis A is a rotary field sensor 25 known per se, which is connected electrically to the abovementioned means of the printed circuit board 42.

Also, arranged in the lower edge area of the plate 23 to a defined extent and at a distance to one another are lighting means, for example light-emitting diodes 27, which are connected electrically to a corresponding supply device and are provided to illuminate for example in each case on the carrier 3 and on the panel 14 of dials provided.

Finally, in the recess in question on the underside of the plate 23 is a microbutton 26 in such a position that in certain situations this is in working connection with the spring element 13 of the one retaining peg 11. The microbutton 26 is provided here as a suitable switching device for a not illustrated relay, which in the present embodiment serves as switching the power supply on and off for a respective device of the initial type.

The plate 23 can be designed for example as part of the abovementioned, printed circuit board 42 for the component groups of the control or it can be integrated in a printed circuit board 42, which is then connected to the guide component 17.

FIG. 2 finally shows a variant (illustrated offset) of the double ball catch of the operating element of the rotary selector 1 rotatable about its axis A, which here is designated with position 28, whereby a carrier 29 and a control knob 30 are provided similarly to FIG. 1.

Contrary to the illustration in FIG. 1 a locking contour 31 and a defined arranged threaded part 32 are located on the operating element 28, while balls 33 with spring elements 34 are installed in spring guides 35 in the panel of the device, not illustrated here.

By way of the described arrangement the locking contour 31 is easier to manufacture, and additionally simplifying assembly in the corresponding counterpart of the panel originates through the threaded part 32, in that the operating element is "screwed in" through a position corresponding to the respective program preset in the correspondingly preset opening in the panel and fixed therein.

The operating element 2 is inserted by compressing the balls 7 on the catch element 6 in the locking contour 18 of the guide component 17 for assembling the described rotary selector 1 such that the retaining pegs 11 contact the circular surface 21 on the guide component 17.

At the same time corresponding measures ensure that the operating element 2 is mounted to catch and rotate corresponding to capacity and the locking of the balls 7 in the grooves 19.

In completion of the rotary selector 1 the plate 23 attached by means of its guides 24 on the guide pins 22, guaranteeing exact positioning of the rotary field sensor 25 relative to the magnetic device 10 mounted rotatably at a distance. The microbutton 26 is located opposite the spring element 13 on one of the retaining pegs 11.

The abovementioned and centric recess, not detailed here, in the plate 23 enables a distance from the surface 21 for a free rotary movement of the operating element 2 with the retaining pegs 11, whereby according to the design of the rotary selector 1 described here at first contacting of the spring element 13 for example switching on occurs, and at second contacting, for example by turning back the operating element 2, the power supply is switched off via the microbutton 16.

When the plate 23 is in the attached state on the guide component 17 the light-emitting diodes 27 are in the vicinity of the openings 20, resulting in indirect lighting of the depression 16, in the panel 14 in the vicinity of the disc-shaped carrier 3, for example for better recognition of program symbols and other information.

The operation of the inventive rotary selector will now be briefly described hereinbelow:

The rotary selector 1 serves as display console for on and off switching and automatic control of a number of different cycles of electrically operated devices, such as washing machines 40 having a drum 41, dryers, dishwashers or comparable appliances.

For this the operating element 2 mounted rotatably in the rotary selector 1 is connected with its magnetic device 10 arranged on the catch element 6 with defined and set magnetic field contact-free with the magnetic rotary field sensor 25.

Integrated in the rotary field sensor 25 is an interface which transfers an angle-dependent code to an electronic evaluation and control unit for recognition of a set angle or respectively of a corresponding position of a marking on the operating element 2 relative to another marking with its defined rotating. A freely specifiable program sequence is assigned to a position preset by the magnetic device 10 in the rotary field sensor 25.

The full angle of rotation of 360° C. can be divided in a known manner with the rotary selector 1 of the abovementioned type into as many as two hundred and fifty six bit patterns, whereby each bit pattern is assigned the abovementioned, respective program sequence by the corresponding control unit.

The advantages of the novel rotary selector in particular are that when the characteristics of the initially mentioned solutions are utilised its assembly and maintenance are substantially simplified, customer wishes are better catered to and precise selection, perceptible and also audible through locking, of corresponding, otherwise contact-free switchable programs can be made in addition to the plurality of differing applications.

The invention claimed is:

1. A rotary selector usable as display console for contact-free on and off switching and for automatic control of a number of different cycles of an electrically operated device, the selector comprising:
 a rotatable operating element having a rotational axis and magnetic device axially arranged on the operating element;
 a panel comprising a guide component including a fixable plate and a magnetic rotary field sensor connected to the fixable plate, the operating element being received by the guide component;
 at least one of the guide component and the operating element having a catch element, and the other having a locking contour, the catch element engaging the locking contour with a force along a plane that is perpendicular to the rotational axis of the operating element and forming multiple defined steps as the operating element rotates with respect to the guide component; and
 the magnetic device being disposed a distance from the rotary field sensor and being rotatably movable in a defined step-wise manner with respect to the rotary field sensor, the rotation of the magnetic device corresponding to the operation of the rotary field sensor and the distance of the magnetic device from the rotary field sensor remaining the same throughout the rotation of the magnetic device.

2. The rotary selector of claim 1, wherein the operating element includes the catch element having a hollow cylindrical ball guide, a radially inserted spring element disposed within the ball guide, and at least one ball, the spring element acting on the ball in a radially outwardly direction.

3. The rotary selector of claim 2, wherein the catch element includes a double ball catch with two radial opposing balls acting in the ball guide against the compression spring.

4. The rotary selector of claim 2, wherein the guide component has an internal cylindrical surface including the locking contour defining multiple axial depressions individually adapted for engaging the ball, the number of axial depressions being selectable in response to the desired quantity of work and program steps to be controlled.

5. The rotary selector of claim 1, wherein the guide component includes the catch element having radial spring guides and a spring element and at least one ball disposed in the spring guide, the balls corresponding to the locking contour defined on the operating element.

6. The rotary selector of claim 1, wherein the plate includes guide bores and the guide component includes guide pins engaging corresponding guide pins, the rotary field sensor being arranged centrally to the axis of the plate and configured as a Hall element.

7. The rotary selector of claim 1, wherein the operating element includes a first threaded part engaging the guide component.

8. The rotary selector of claim 1, wherein the operating element has retaining pegs that engage an annular surface on the guide component for axially pivotal bearing attachment of the operating element.

9. The rotary selector of claim 1, wherein the operating element has retaining pegs engaging the guide component and a lever is attached to one of the retaining pegs and contacts a microbutton arranged on the plate when the operating element is in a defined position with respect to the guide component.

10. The rotary selector of claim 9, wherein the microbutton is connected to a relay for switching on and off the power supply for the electrically operated device.

11. The rotary selector of claim 1, further comprising at least one light source positioned on the plate.

12. The rotary selector of claim 1, wherein the light source includes light-emitting diodes.

13. The rotary selector of claim 12, wherein the panel includes a recess defining a depression and circularly arranged openings disposed near the recess, the light-emitting diodes being arranged such that the depression in the panel is indirectly illuminated through the openings.

14. The rotary selector of claim 1, wherein the plate includes a printed circuit board carrying electronic structural elements, the plate being connected to the electronic structural elements as part of the printed circuit board.

15. The rotary selector of claim 1, wherein the magnetic device is coupled to the magnetic rotary field sensor without physical contact by Hall sensor technology and wherein an interface is integrated in the rotary field sensor via which an angle-dependent code is transferred to an electronic evaluation and control unit.

16. A rotary selector for contact-free on and off switching and for automatic control multiple operating cycles of a household appliance, the selector comprising:
 a rotatable operating element having a magnetic device axially arranged on the operating element;

a panel comprising a recess forming a depression and a cylindrical guide component connected to the recess with at least one annular leg, the operating element being received by the guide component and having retaining pegs engaging an annular surface of the guide component, the operating element having a catch element and the guide component having a locking contour, the catch element engaging the locking contour and forming multiple defined steps as the operating element rotates with respect to the guide component; and a fixable plate connected to the guide component and having a magnetic rotary field sensor connected to the fixable plate, the magnetic device being disposed a distance from the rotary field sensor and being rotatably movable in a defined step-wise manner with respect to the rotary field sensor, the rotation of the magnetic device corresponding to the operation of the rotary field sensor.

17. The rotary selector of claim 16, wherein the catch element includes a hollow cylindrical ball guide, a radially inserted spring element disposed within the ball guide, and at least one ball, the locking contour defining multiple axial depressions, the spring element acting on the ball and biasing the ball in a radially outwardly direction to engage one of the axial depressions.

18. The rotary selector of claim 16, wherein the magnetic device is coupled to the magnetic rotary field sensor without physical contact by Hall sensor technology and wherein an interface is integrated in the rotary field sensor via which an angle-dependent code is transferred to an electronic evaluation and control unit.

19. The rotary selector of claim 16, further comprising at least one light-emitting diode positioned on the plate facing the operating element, the panel having at least one circularly arranged opening on the annular leg, the at least one light-emitting diode being arranged such that the depression in the panel is indirectly illuminated through the at least one opening.

20. A washing machine comprising:

a housing;

a drum at least partially disposed within the housing and mounted for rotation with respect to the housing;

a control unit controlling the on and off switching and the automatic control of multiple operational cycles of the washing machine;

a rotatable operating element having a magnetic device axially arranged on the operating element;

a panel supported by the housing and comprising a recess forming a depression and a cylindrical guide component connected to the recess with at least one annular leg, the operating element being axially received by the guide component and having retaining pegs engaging an annular surface of the guide component, the operating element having a catch element and the guide component having a locking contour, the catch element engaging the locking contour and forming multiple defined steps as the operating element rotates with respect to the guide component;

a fixable plate connected to the guide component and having a magnetic rotary field sensor connected to the fixable plate, the magnetic device being disposed a distance from the rotary field sensor and being rotatably movable in a defined step-wise manner with respect to the rotary field sensor;

the magnetic device being coupled via its magnetic field to the magnetic rotary field sensor in non-contacting Hall sensor technology, the rotary field sensor sensing the position of the magnetic device with respect to the rotary field sensor; and an interface integrated into the rotary field sensor and sending a signal to the control unit representing the position of the magnetic device with respect to the rotary field sensor, the signal corresponding to one of the multiple operational cycles of the washing machine.

\* \* \* \* \*